United States Patent
Vadakkanmaruveedu et al.

(10) Patent No.: US 10,046,913 B1
(45) Date of Patent: Aug. 14, 2018

(54) CONVEYOR SYSTEM HAVING A KNOCK-DOWN DEVICE THAT REORIENTS STACKED OBJECTS INTO A SEQUENTIAL ORIENTATION

(71) Applicant: Amazon Technologies, Inc., Seattle, WA (US)

(72) Inventors: Unnikrishnan Vadakkanmaruveedu, Chandler, AZ (US); Jon Stuart Battles, North Bend, WA (US); Emily Dunne, Seattle, WA (US); Samuel Gardner Garrett, Seattle, WA (US); Timothy Alan Talda, Seattle, WA (US); Akshay Rajendra Tilekar, Seattle, WA (US); Jacqueline Underberg, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/587,712

(22) Filed: May 5, 2017

(51) Int. Cl.
*B65G 15/60* (2006.01)
*B65G 39/02* (2006.01)

(52) U.S. Cl.
CPC ............ *B65G 15/60* (2013.01); *B65G 39/02* (2013.01)

(58) Field of Classification Search
CPC ................................ B65G 15/60; B65G 39/02
USPC .......................................... 198/442, 633, 635
See application file for complete search history.

(56) References Cited

U.S. PATENT DOCUMENTS

| | | | | |
|---|---|---|---|---|
| 4,539,824 A | * | 9/1985 | Kuraoka | A01N 1/02 165/94 |
| 4,909,375 A | * | 3/1990 | Cotic | E01B 29/32 198/393 |
| 5,465,825 A | * | 11/1995 | Levaro | B07C 1/04 198/444 |
| 5,638,938 A | * | 6/1997 | Lazzarotti | B07C 1/02 198/358 |
| 6,000,524 A | * | 12/1999 | Vetruba | B65G 47/252 198/383 |
| 6,237,427 B1 | * | 5/2001 | Helfrich | G01F 1/28 198/502.2 |
| 8,448,778 B2 | * | 5/2013 | Grydgaard | B65G 47/72 198/364 |

* cited by examiner

*Primary Examiner* — Douglas A Hess
(74) *Attorney, Agent, or Firm* — Baker & Hostetler, LLP

(57) ABSTRACT

In one embodiment, a conveyor system has a conveyor segment and a knock-down device. The conveyor segment has an upstream end, and a downstream end opposite the upstream end. The conveyor segment defines a conveying surface that carries objects along a flow direction that extends from the upstream end to the downstream end. The knock-down device has a knock-down body that is spaced entirely from the conveying surface along a vertical direction by at least a clearance height. The knock-down body has an upstream body end, a downstream body end offset from the upstream body end with respect to the flow direction, and a ramped surface that extends between the upstream body end and the downstream body end. The ramped surface is ramped away from the conveying surface as the ramped surface extends along the flow direction, and knocks down objects that are stacked on top of one another.

19 Claims, 6 Drawing Sheets

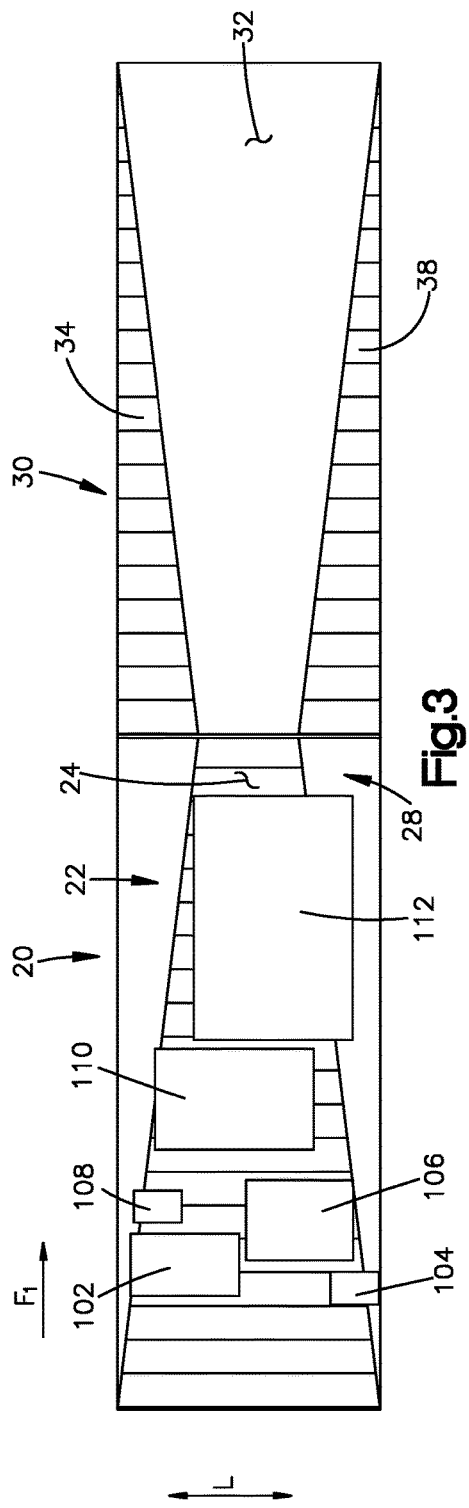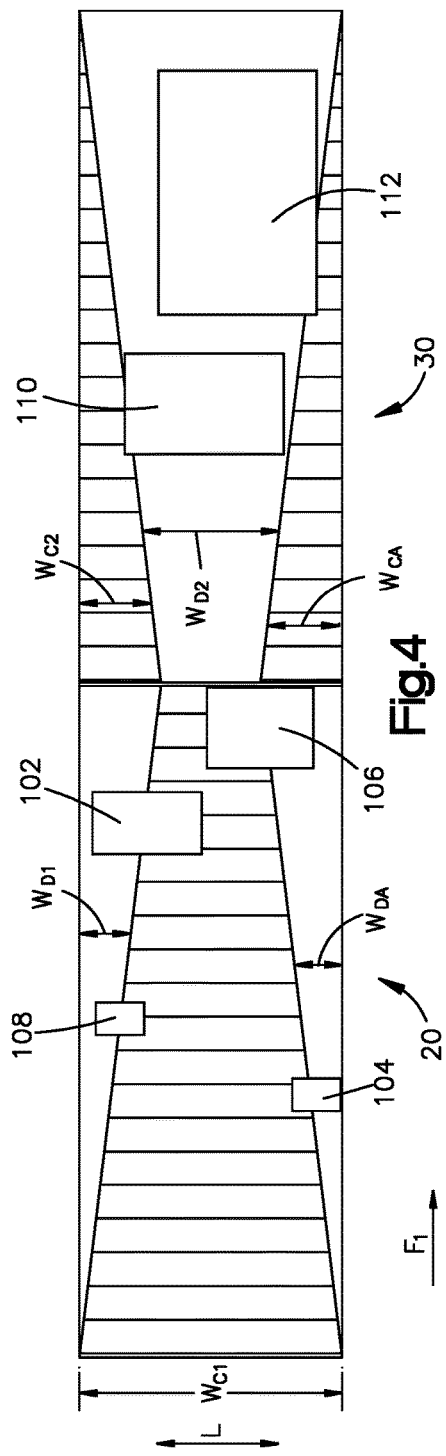

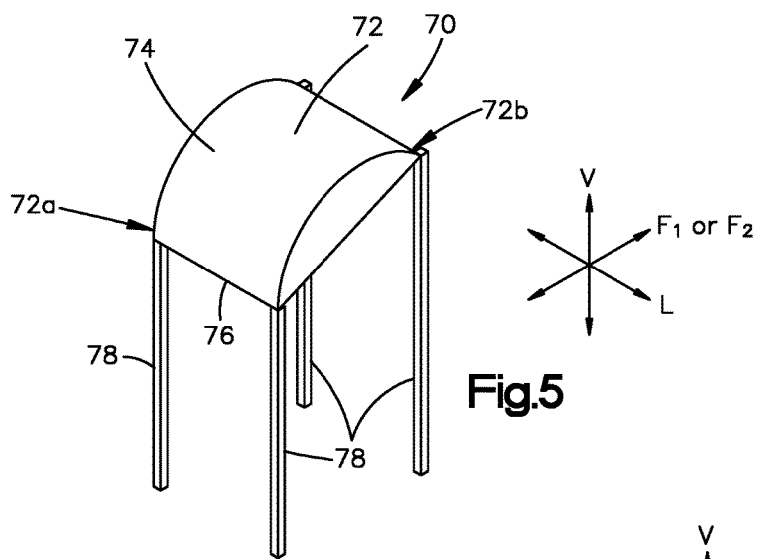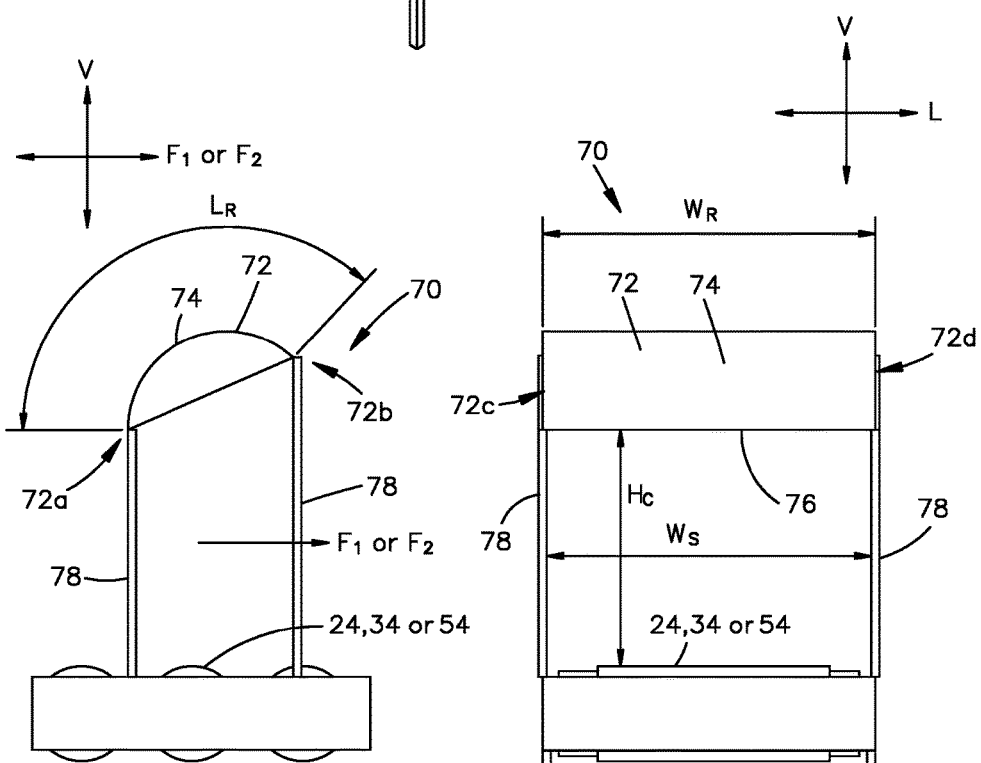

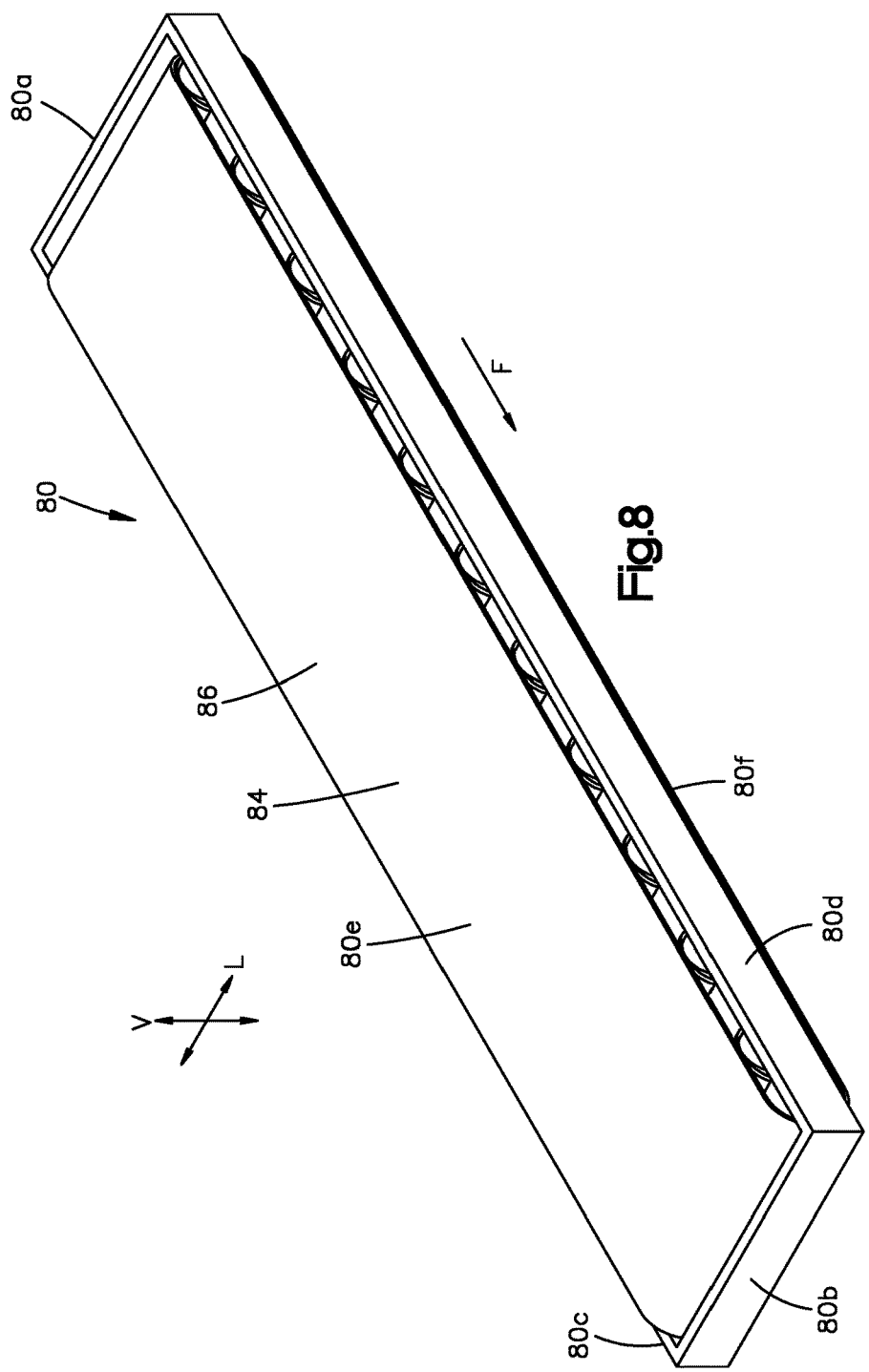

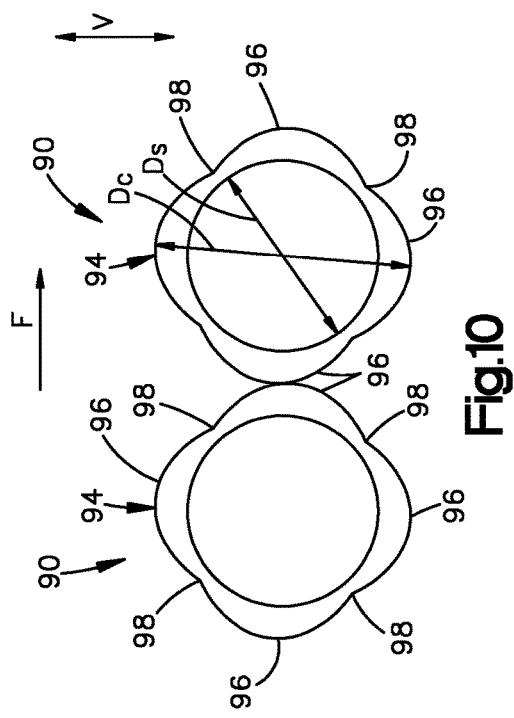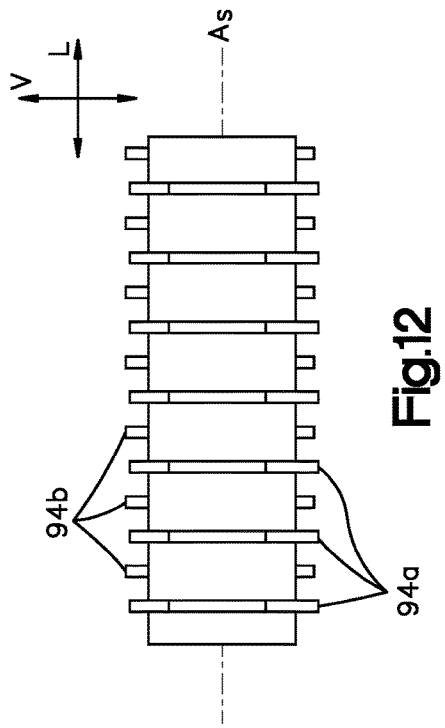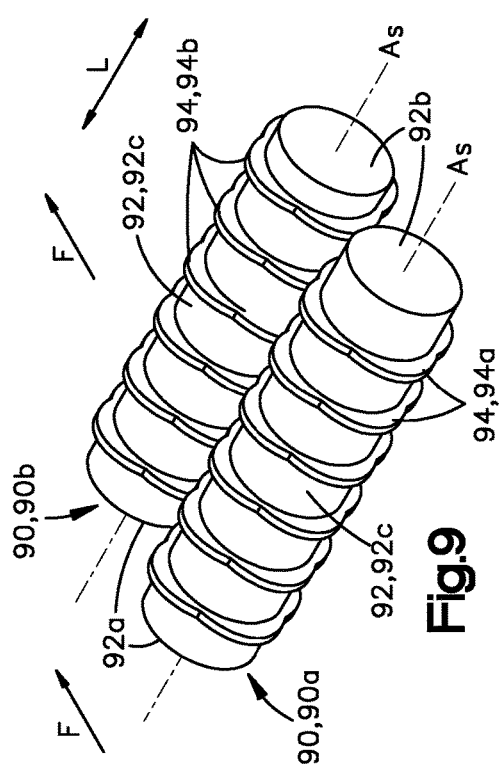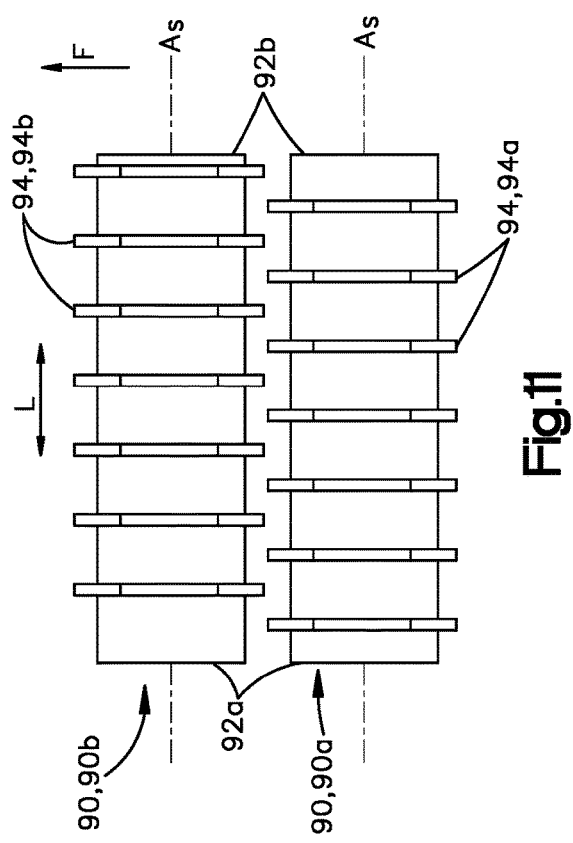

US 10,046,913 B1

CONVEYOR SYSTEM HAVING A KNOCK-DOWN DEVICE THAT REORIENTS STACKED OBJECTS INTO A SEQUENTIAL ORIENTATION

BACKGROUND

In material handling facilities, such as order fulfillment centers, one or more agents or pickers pick objects from inventory to fulfill orders. The agents may pick objects from multiple different orders and then place the objects from the multiple orders on a conveyor system. As a result, objects from multiple orders or portions of orders can be intermingled on the conveyor system. The intermingled objects must then be sorted into their respective orders. Before sorting, the intermingled objects can be processed through a procedure referred to as singulation, whereby objects that are arranged together in a side-by-side or stacked orientation on the conveyor system are rearranged into a sequential orientation such that the objects are disposed one-after-another and spaced apart. The sequentially-arranged objects are then inducted into a sorting station that places each individual object with its respective order to be passed on to packing stations or other fulfillment centers or to other types of stations such as gift wrapping stations. The sorting process is done at a speed that meets or exceeds customer demands.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 3 shows a schematic top view of an upper conveyor level of the multi-level conveyor of FIG. 1 carrying objects of various sizes;

FIG. 4 shows the schematic top view of FIG. 3 with the objects positioned at locations where the objects would drop through the discharge openings of the upper conveyor level;

FIG. 5 shows a perspective view of a knock-down assembly according to one embodiment;

FIG. 6 shows a side view of the knock-down assembly of FIG. 5;

FIG. 7 shows a front view of the knock-down assembly of FIG. 5;

FIG. 8 shows a perspective view of a undulation conveyor according to one embodiment;

FIG. 9 shows a perspective view of a pair of undulation rollers of the undulation conveyor of FIG. 8 according to one embodiment;

FIG. 10 shows an end view of the pair of undulation rollers of FIG. 9;

FIG. 11 shows a top view of the pair of undulation rollers of FIG. 9; and

FIG. 12 shows a side view of the pair of undulation rollers of FIG. 9.

DETAILED DESCRIPTION

Item singulation may be performed by a human operator that manually rearranges the objects into a sequential and spaced-apart orientation on a conveyor system before the objects are inducted into a sorting station. Relative to manual singulation, an automated multi-level conveyor system may be used to increase item singulation rate.

Figure 1:
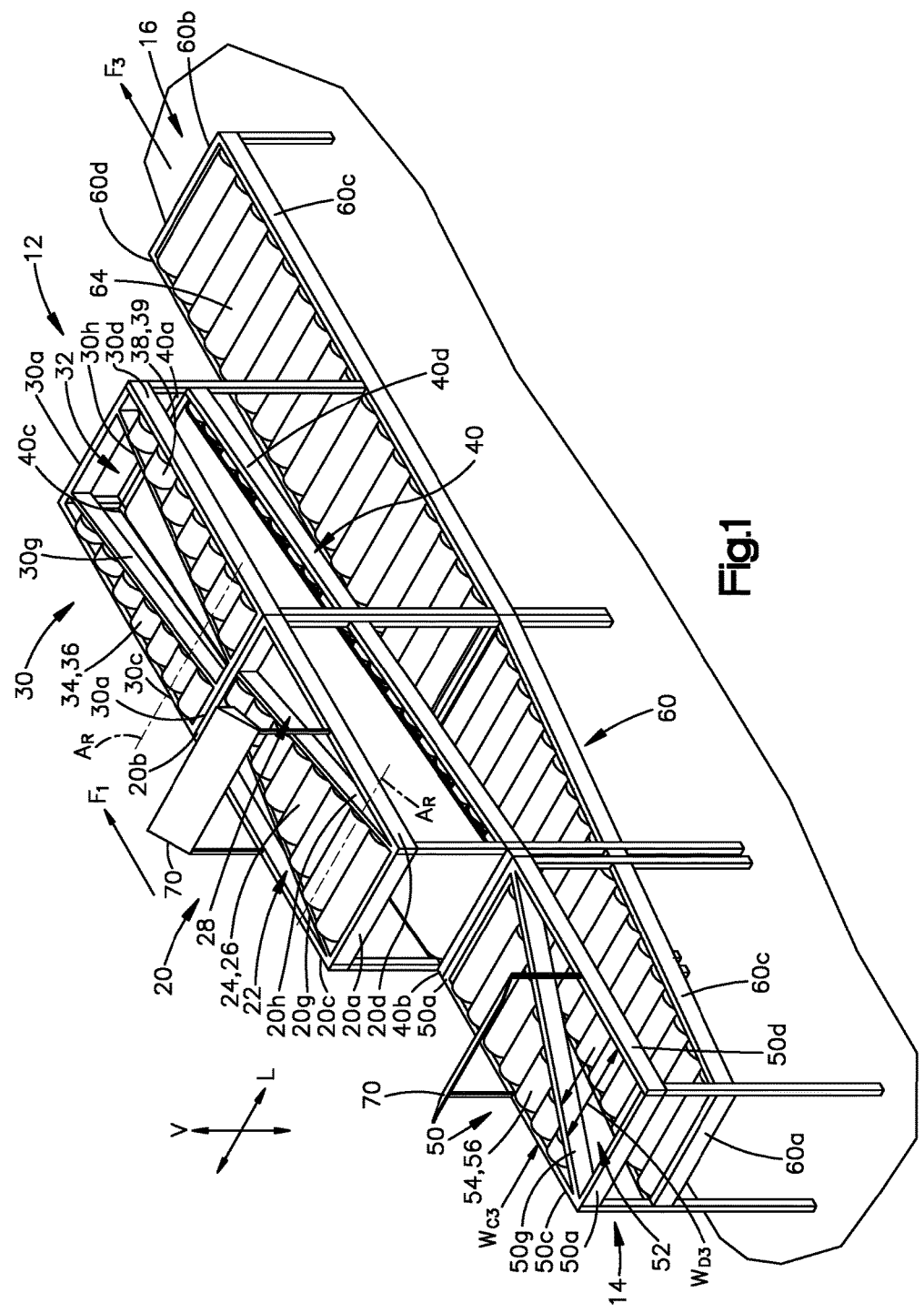
FIG. 1 shows a perspective view of a multi-level conveyor system according to one embodiment.
Figure 2:
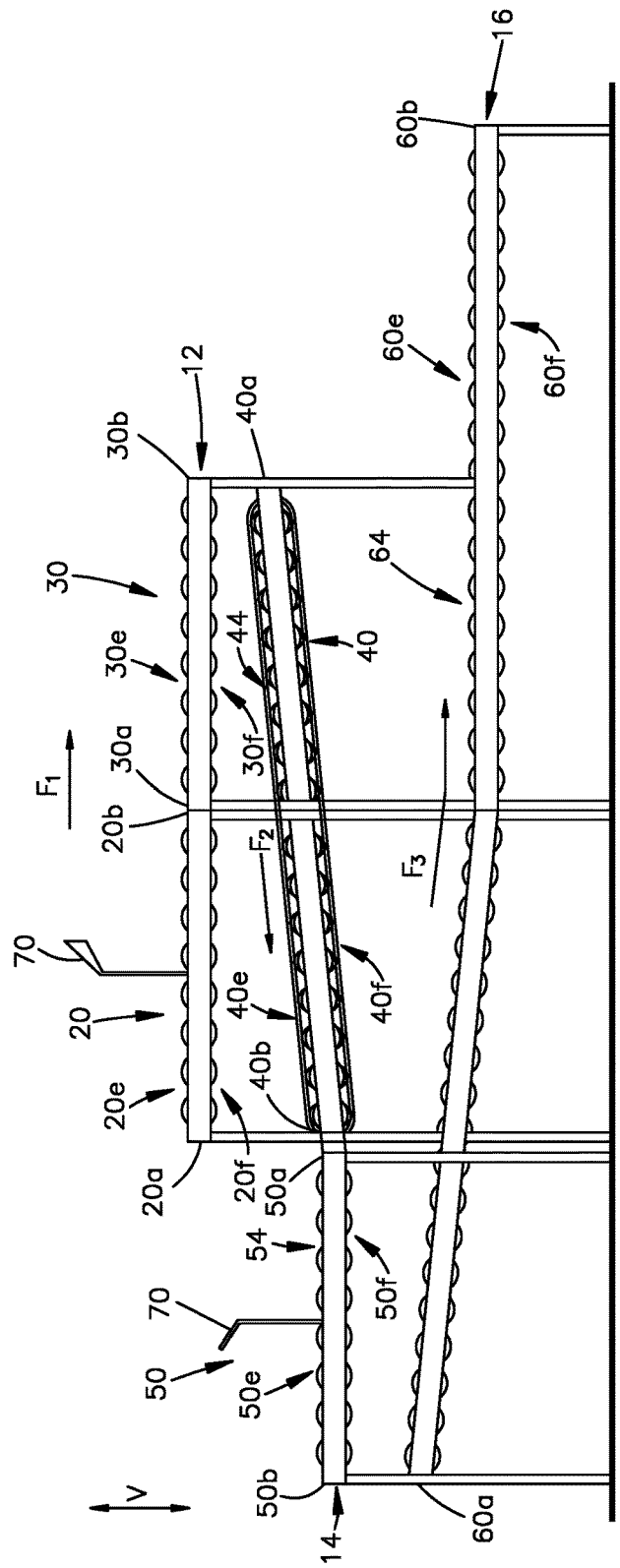
FIG. 2 shows a side view of the multi-level conveyor system of FIG. 1.

Referring to FIGS. 1 and 2, a multi-level conveyor system 10 is shown that is configured to automatically singulate objects. The conveyor system 10 has three levels, including an upper conveyor level 12, a subsequent conveyor level 14, and a lower conveyor level 16. The subsequent conveyor level 14 is disposed at least partially between the upper conveyor level 12 and the lower conveyor level 16, and therefore, can be considered to be an intermediate conveyor. It will be understood that, in alternative embodiments, the system 10 can have as few as two conveyor levels or more than three conveyor levels. Further, the terms "upper" and "lower" refer to positions relative to the subsequent conveyor level 14. Thus, although the upper conveyor level 12 is shown as the top level and the lower conveyor level 16 is shown as the bottom level, it will be understood that the conveyor system 10 can have one or more levels above the upper conveyor level 12 and one or more levels below the lower conveyor level 16. Moreover, the conveyor system 10 can have more than one level between the upper conveyor level 12 and the lower conveyor level 16.

In general, the upper conveyor level 12 conveys objects along an upper-level flow direction $F_1$ before discharging the objects to the subsequent conveyor level 14. The subsequent conveyor level 14 is disposed at least partially below the upper conveyor level 12 so as to receive objects falling from the upper conveyor level 12. The subsequent conveyor level 14 carries objects along a subsequent-level flow direction $F_2$, before discharging the objects to the lower conveyor level 16. The lower conveyor level 16 is disposed at least partially below the subsequent conveyor level 14 so as to receive objects falling from the subsequent or intermediate conveyor level 14. The lower conveyor level 16 carries objects along a lower-level flow direction $F_3$. The flow directions $F_1$, $F_2$, and $F_3$ can be straight as shown or can be curved (not shown in the figures). Further, the subsequent-level flow direction $F_2$ can be opposite the upper-level flow direction $F_1$, and the lower-level flow direction $F_3$ can be the same as the upper-level flow direction $F_1$ and opposite the subsequent-level flow direction $F_2$, although the present invention is not so limited.

The system 10 has at least one feature configured to reorient objects from at least one of a side-by-side orientation and a stacked orientation (i.e., one on top of another) to a sequential orientation in which the objects are disposed one-after-another. The at least one feature can include at least one conveyor segment, such as a plurality of conveyor segments 20, 30, and 50, configured to discharge objects of varying sizes to a conveyor level below at varying times. Additionally or alternatively, the at least one feature can include at least one knock-down device 70 configured to knock down objects that are stacked on top of one another. Additionally or alternatively, the at least one feature can include at least one undulation conveyor segment 40 that is configured to undulate objects received in a stacked orientation so as to cause the stacked objects to separate from one another.

The at least one conveyor segment can comprise a conveyor segment 20 configured to discharge objects that are received along the lateral sides of the conveyor segment 20 and carry objects received along a center of the conveyor segment 20 downstream. The size of the objects discharged by the conveyor segment 20 can increase along the flow direction of the conveyor segment 20. The at least one conveyor segment can additionally or alternatively comprise a conveyor segment 30 configured to discharge objects of increasing size that are received along a center of the conveyor segment 30 and carry objects received along the lateral sides of the conveyor segment 30 downstream (assuming the objects received along the lateral sides have not already been discharged by a previous conveyor segment). The size of the objects discharged by the conveyor segment 30 can increase along a flow direction of the conveyor segment 30. Further, the conveyor segment 30 is capable of discharging objects that are larger than the objects discharged from the conveyor segment 20. The at least one conveyor segment can additionally or alternatively comprise a conveyor segment 50 configured to discharge all objects that are received by the conveyor segment 50, where the size of the objects discharged increases along the flow direction of the conveyor segment 50. In the embodiment of FIGS. 1 and 2, the conveyor segments 20 and 30 are implemented on the upper conveyor level 12, and the conveyor segment 50 is implemented on the subsequent conveyor level 14. However, it will be understood that the conveyor segments 20, 30, and 50 can be implemented on any conveyor level of the system 10 that is above another conveyor level.

Turning now more specifically to the example upper conveyor level 12, the conveyor segment 20, which can be considered a first upper conveyor segment, has an upstream end 20a, and a downstream end 20b opposite the upstream end 20a along an upper-level flow direction $F_1$. The upper-level flow direction $F_1$ can be straight as shown or can be curved. The upper conveyor segment 20 has a pair of first and second lateral sides 20c and 20d that oppose one another. The first and second lateral sides 20c and 20d can be parallel to one another, although embodiments of the disclosure are not so limited. Further, the upper conveyor segment 20 has a top side 20e, and a bottom side 20f that opposes the top side 20e along a vertical direction V, perpendicular to the upper-level flow direction $F_1$.

The upper conveyor segment 20 can include at least one internal wall, such as first and second internal walls 20g and 20h, between the pair of lateral sides 20c and 20d. The first internal wall 20g can be between the first lateral side 20c and the second internal wall 20h. Further, the second internal wall 20h can be between the second lateral side 20d and the first internal wall 20g. The first and second internal walls 20g and 20h can extend from the upstream end 20a to the downstream end 20b. The first and second internal walls 20g and 20h can taper towards one another along the upper-level flow direction $F_1$. The first internal wall 20g can taper towards the first lateral side 20c along a direction opposite the upper-level flow direction $F_1$, and the second internal wall 20h can taper towards the second lateral side 20d along the direction opposite the upper-level flow direction $F_1$.

The upper conveyor segment 20 defines an upper conveying surface 24 between the pair of lateral sides 20c and 20d and configured to carry objects along the upper-level flow direction $F_1$. For example, the upper conveying surface 24 can extend between the first and second internal walls 20g and 20h, such as from the first internal wall 20g to the second internal wall 20h. The upper conveying surface 24 can also extend from the upstream end 20a to the downstream end 20b. The upper conveying surface 24 has a conveying width $W_{C1}$ (see FIG. 4) along a lateral direction L that extends from the first lateral side 20c to the second lateral side 20d. For example, the conveying surface width $W_{C1}$ can extend from the first internal wall 20g to the second internal wall 20h. Further, the conveying width $W_{C1}$ can decrease along the upper-level flow direction $F_1$ so as to form a "V" shape (or truncated "V" shape) with its vertex pointing towards the downstream direction (i.e., along the upper-level flow direction $F_1$). In at least some embodiments, the lateral direction L can be perpendicular to both the upper-level flow direction $F_1$ and the vertical direction V.

The upper conveyor segment 20 can comprise a plurality of upper rollers 26 that define the upper conveying surface 24. Each roller 26 can extend along a roller central axis $A_R$ that extends from the first lateral side 20c to the second lateral side 20d along the lateral direction L. For example, each roller 26 can extend between the first internal wall 20g and the second internal wall 20h along a respective roller central axis $A_R$, such as from the first internal wall 20g to the second internal wall 20h. The upper rollers 26 can be powered such that each upper roller 26 rotates about a respective central roller axis $A_R$ in a direction that carries objects along the upper-level flow direction $F_1$. For example, each upper roller 26 can rotate in a direction that is towards the upper-level flow direction $F_1$ and downward. It will be understood that, in alternative embodiments, the upper conveying surface 24 can be implemented using other suitable conveying mechanisms, such as (without limitation) conveyor belts and wheels.

The upper conveyor segment 20 defines an upper discharge opening 22 that is between the upper conveying surface 24 and the first lateral side 20c. The upper discharge opening 22 can extend between the first lateral side 20c and the first internal wall 20g, such as from the first lateral side 20c to the first internal wall 20g. The upper discharge opening 22 extends through the upper conveyor segment 20 along the vertical direction V, such as through the top side 20e and the bottom side 20f. Further, the upper discharge opening 22 can between the upstream end 20a and the downstream end 20b, such as from the upstream end 20a to the downstream end 20b. The upper discharge opening 22 has a discharge opening width $W_{D1}$ that extends along a direction that extends from the first lateral side 30c to the second lateral side 30d, such as along the lateral direction L. The discharge opening width $W_{D1}$ can extend from the first lateral side 20c to the first internal wall 20g. The discharge opening width $W_{D1}$ preferably increases along the upper-level flow direction $F_1$.

The upper conveyor segment 20 can also define an additional upper discharge opening 28, although embodiments of the disclosure are not limited to having the additional upper discharge opening 28. The additional upper discharge opening 28 can be between the upper conveying surface 24 and the second lateral side 20d. Thus, the upper conveying surface 24 can be between the upper discharge opening 22 and the additional upper discharge opening 28. The additional upper discharge opening 28 can extend between the second lateral side 20d and the second internal wall 20h, such as from the second lateral side 20d and the second internal wall 20h. The additional upper discharge opening 28 extends through the upper conveyor segment 20 along the vertical direction V, such as through the top end 20e and the bottom end 20f. Further, the additional upper discharge opening 28 can between the upstream end 20a and the downstream end 20b, such as from the upstream end 20a to the downstream end 20b. The additional upper discharge opening 28 has a discharge opening width $W_{DA}$ (See FIG. 4) along a direction that extends from the first lateral side 20c to the second lateral side 20d, such as along the lateral direction L. The discharge opening width $W_{DA}$ can extend from the second lateral side 20d to the second internal wall 20h. The discharge opening width $W_{DA}$ can increase along the upper-level flow direction $F_1$.

In operation, and with reference to FIGS. 3 and 4, the upper conveyor segment 20 receives objects at various locations between the first and second lateral sides 20c and 20d. Objects that are aligned with the upper discharge opening 22 along the upper-level flow direction $F_1$, such as objects 102 and 108, are carried by the upper conveying surface 24 along the upper-level flow direction $F_1$ until a sufficient portion of the object is disposed over the upper discharge opening 22 for gravity to pull the object the upper discharge opening 22. In other words, each object 102 and 108 is dropped through the upper discharge opening 22 when a width of the object along the lateral direction L sufficiently conforms to the width $W_{D1}$ of the upper discharge opening 22.

Similarly, objects that are aligned with the additional upper discharge opening 28 along the upper-level flow direction $F_1$, such as objects 104 and 106, are carried by the upper conveying surface 24 along the upper-level flow direction $F_1$ until a sufficient portion of the object is disposed over the additional upper discharge opening 28 for gravity to pull the object the additional upper discharge opening 28. In other words, each object 104 and 106 is dropped through the additional upper discharge opening 28 when a width of the object along the lateral direction L substantially conforms to the width $W_{DA}$ of the additional upper discharge opening 28.

Objects that are aligned with the upper conveying surface 24, such as objects 110 and 112 are carried by the upper conveying surface 24 along the upper-level flow direction $F_1$ to the additional upper conveying segment 30. Thus, when the upper conveyor segment 20 receives first and second objects in a side-by-side orientation such that the first object is aligned with the upper discharge opening 22 (or the additional upper discharge opening 28), and the second object is aligned with the upper conveying surface 24, the first object is dropped through the upper discharge opening 22 (or the additional upper discharge opening 28) to the subsequent conveyor level 14 before the second object is dropped to the subsequent conveyor level 14 so as to arrange the first and second objects on the subsequent conveyor level 14 in a sequential orientation (e.g., the first object in front of the second object with respect to the subsequent-level flow direction $F_2$).

Referring back to FIGS. 1 and 2, the upper conveyor segment 30, which can be considered a second upper conveyor segment, has an upstream end 30a, and a downstream end 30b opposite the upstream end 30a along the upper-level flow direction $F_1$. The upper conveyor segment 30 has a pair of first and second lateral sides 30c and 30d that oppose one another. The first and second lateral sides 30c and 30d can be parallel to one another, although embodiments of the disclosure are not so limited. Further, the upper conveyor segment 30 has a top side 30e, and a bottom side 30f that opposes the top side 30e along the vertical direction V. The first and second upper conveyor segments 20 and 30 are offset from one another with respect to the upper-level flow direction $F_1$. In this embodiment, the upstream end 30a of the second upper conveyor segment 30 is connected to the downstream end 30b of the first upper conveyor segment 20. However, it will be understood that embodiments of the disclosure are not so limited. For example, the system 10 can include at least one other conveyor segment between the first and second upper conveyor segments 20 and 30.

The upper conveyor segment 30 can include at least one internal wall, such as first and second internal walls 30g and 30h, between the pair of lateral sides 30c and 30d. The first internal wall 30g can be between the first lateral side 30c and the second internal wall 30h. Further, the second internal wall 30h can be between the second lateral side 30d and the first internal wall 30g. The first and second internal walls 30g and 30h can extend from the upstream end 30a to the downstream end 30b. The first and second internal walls 30g and 30h can taper towards one another along a direction opposite the upper-level flow direction $F_1$. The first internal wall 30g can taper towards the first lateral side 30c along the upper-level flow direction $F_1$, and the second internal wall 30h can taper towards the second lateral side 30d along the upper-level flow direction $F_1$.

The upper conveyor segment 30 defines an upper conveying surface 34 between the pair of lateral sides 30c and 30d and is configured to carry objects along the upper-level flow direction $F_1$. For example, the upper conveying surface 34 can extend between the first lateral side wall 30c and the first internal wall 30g, such as from the first lateral side wall 30c to the first internal wall 30g. The upper conveying surface 34 can also extend between the upstream end 30a and the downstream end 30b, such as from the upstream end 30a to the downstream end 30b. The upper conveying surface 34 has a conveying width $W_{C2}$ (see FIG. 4) that extends along a direction that extends from the first lateral side 30c to the second lateral side 30d, such as along the lateral direction L. For example, the conveying surface width $W_{C2}$ can extend from the first lateral side 30c to the first internal wall 30g. Further, the conveying width $W_{C2}$ can decrease along the upper-level flow direction $F_1$.

The upper conveyor segment 30 can comprise a plurality of upper rollers 36 that define the upper conveying surface 34. Each roller 36 can extend along a roller central axis $A_R$ that extends from the first lateral side 30c to the second lateral side 30d. For example, each roller 36 can extend between the first lateral side 30c and the first internal wall 30g along a respective roller central axis $A_R$, such as from the first lateral side 30c to the first internal wall 30g. The upper rollers 36 can be powered such that each upper roller 36 rotates about a respective central roller axis $A_R$ in a direction that carries objects along the upper-level flow direction $F_1$. For example, each upper roller 36 can rotate in a direction that is towards the upper-level flow direction $F_1$ and downward. It will be understood that, in alternative embodiments, the upper conveying surface 34 can be implemented using other suitable conveying mechanisms, such as (without limitation) conveyor belts and wheels.

The upper conveyor segment 30 defines an upper discharge opening 32 that is between the upper conveying surface 34 and the second lateral side 30d. The upper discharge opening 32 can extend between the first internal wall 30g and second internal wall 30h. The upper discharge opening 32 extends through the upper conveyor segment 30 along the vertical direction V, such as through the top end 30e and the bottom end 30f. Further, the upper discharge opening 32 can extend between the upstream end 30a and the downstream end 30b, such as from the upstream end 30a to the downstream end 30b. The upper discharge opening 32 has a discharge opening width $W_{D2}$ (see FIG. 4) along a direction that extends from the first lateral side 30c to the second lateral side 30d, such as along the lateral direction L. The discharge opening width $W_{D2}$ can extend from the first internal wall 30g and second internal wall 30h. The discharge opening width $W_{D2}$ can increase along the upper-level flow direction $F_1$ so as to form a "V" shape (or truncated "V" shape) with its vertex pointing towards the upstream direction (i.e., opposite the upper-level flow direction $F_1$). The discharge opening width $W_{D2}$ at the largest part of the upper discharge opening 22 may be chosen according to the largest desired package dimension that will be discharged through the upper discharge opening 32.

The upper conveyor segment 30 can also define an additional upper conveying surface 38, although embodiments of the disclosure are not limited to having the additional upper conveying surface 38. The additional upper conveying surface 38 can be between the upper discharge opening 32 and the second lateral side 30d. Thus, the upper discharge opening 32 can be between the upper conveying surface 34 and the additional upper conveying surface 38. The additional upper conveying surface 38 can extend between the second lateral side 30d and the second internal wall 30h, such as from the second lateral side 30d to the second internal wall 30h. The additional upper conveying surface 38 extends through the upper conveyor segment 30 along the vertical direction V, such as through the top end 30e and the bottom end 30f. Further, the additional upper conveying surface 38 can extend between the upstream end 30a and the downstream end 30b, such as from the upstream end 30a to the downstream end 30b. The additional upper conveying surface 38 has a conveying width $W_{CA}$ (see FIG. 4) along a direction that extends from the first lateral side 30c to the second lateral side 30d, such as along the lateral direction L. The conveying width $W_{CA}$ can extend from the second lateral side 30d to the second internal wall 30h. The conveying width $W_{CA}$ can decrease along the upper-level flow direction $F_1$.

The upper conveyor segment 30 can comprise an additional plurality of upper rollers 39 that define the additional upper conveying surface 38. Each roller 39 can extend along a roller central axis $A_R$ that extends from the first lateral side 30c to the second lateral side 30d. For example, each roller 39 can extend between the second lateral side 30d and the second internal wall 30h along a respective roller central axis $A_R$, such as from the second lateral side 30d to the second internal wall 30h. The additional upper rollers 39 can be powered such that each upper roller 39 rotates about a respective central roller axis $A_R$ in a direction that carries objects along the upper-level flow direction $F_1$. For example, each additional upper roller 39 can rotate in a direction that is towards the upper-level flow direction $F_1$ and downward. It will be understood that, in alternative embodiments, the upper conveying surface 38 can be implemented using other suitable conveying mechanisms, such as (without limitation) conveyor belts and wheels.

In operation, and with reference to FIGS. 3 and 4, the upper conveyor segment 30 receives objects at various locations between the first and second lateral sides 30c and 30d. Objects that are aligned with the upper discharge opening 32 along the upper-level flow direction $F_1$, such as objects 110 and 112, can be carried by both the upper conveying surface 34 and the additional upper conveying surface 38 along the upper-level flow direction $F_1$ until at least one side of the object is no longer supported by the upper conveying surface 34 or the additional upper conveying surface 38. At this point, gravity pulls the object through the upper discharge opening 32. Thus, when the upper conveyor segment 30 receives first and second objects in a side-by-side orientation such that the first object is aligned with the upper discharge opening 32, and the second object is aligned with the upper conveying surface 34 (or the additional upper conveying surface 38), the first object can be dropped through the upper discharge opening 32 to the subsequent conveyor level 14 before the second object is dropped to the subsequent conveyor level 14 so as to arrange the first and second objects on the subsequent conveyor level 14 in a sequential orientation. (e.g., the first object in front of the second object with respect to the subsequent-level flow direction $F_2$).

Referring back to FIGS. 1 and 2, the subsequent conveyor level 14 conveys objects along the subsequent-level flow direction $F_2$. The subsequent-level flow direction $F_2$ can be opposite the upper-level flow direction $F_1$, although embodiments of the disclosure are not so limited. Moreover, the upper conveyor level 12 and the subsequent conveyor level 14 can each be controlled by a control system to convey objects at a respective speed. The speeds can be varied from one conveyor level to the next by the control system. In a preferred embodiment, the control system can set the speed of the subsequent conveyor level 14 to be greater than the speed of the upper conveyor level 12. This can help to limit objects on the upper conveyor level 12 from falling onto objects on the subsequent conveyor level 14. Further, when an object does fall from the upper conveyor level 12 onto an object residing on the subsequent conveyor level 14, the faster speed of the subsequent conveyor level 14 can cause the falling object to slip off of the object residing on the subsequent conveyor level 14 to a position that is behind the object residing on the subsequent conveyor level 14 with respect to the subsequent-level flow direction $F_2$.

The subsequent conveyor level 14 has a subsequent conveyor segment 40 disposed at least partially below the first and second upper conveyor segments 20 and 30 so as to receive objects falling from the first and second upper conveyor segments 20 and 30. The subsequent conveyor segment 40, which can be referred to as a first subsequent conveyor segment, has an upstream end 40a, and a downstream end 40b opposite the upstream end 40a along the subsequent-level flow direction $F_2$. The subsequent conveyor segment 40 has a pair of first and second lateral sides 40c and 40d that oppose one another. The first and second lateral sides 40c and 40d can be parallel to one another, although embodiments of the disclosure are not so limited. Further, the subsequent conveyor segment 40 has a top side 40e, and a bottom side 40f that opposes the top side 40e along the vertical direction V. The subsequent conveyor segment 40 defines a subsequent conveying surface 44 between the first and second lateral sides 40c and 40d and between the upstream and downstream ends 40a and 40b. For example, the subsequent conveying surface 44 can extend from the first lateral side 40c to the second lateral side 40d, and from the upstream end 40a to the downstream end 40b. The subsequent conveying surface 44 can be devoid of any discharge openings that discharge objects to the lower conveyor level 16. The subsequent conveyor segment 40 can include (without limitation) a plurality of rollers, a conveyor belt, or other suitable conveying elements that define the subsequent conveying surface 44. As will be described in further detail below, in some embodiments, the subsequent conveyor segment 40 can be as an undulation conveyor segment 80 as shown in FIG. 8.

The conveyor segment 50, which can be considered a second subsequent conveyor segment, has an upstream end 50a, and a downstream end 50b opposite the upstream end 50a along the subsequent-level flow direction $F_2$. The subsequent conveyor segment 50 has a pair of first and second lateral sides 50c and 50d that oppose one another. The first and second lateral sides 50c and 50d can be parallel to one another, although embodiments of the disclosure are not so limited. Further, the upper conveyor segment 50 has a top side 50e, and a bottom side 50f that opposes the top side 50e along a vertical direction V. The subsequent segment 50 can include at least one first internal wall 50g between the pair of lateral sides 50c and 50d. The first internal wall 50g can extend from the upstream end 50a to the downstream end 50b. The first internal wall 50g can taper towards the first lateral side 50c along the subsequent-level flow direction $F_2$.

The first and second subsequent conveyor segments 40 and 50 are offset from one another with respect to the subsequent-level flow direction $F_2$. In this embodiment, the upstream end 50a of the second subsequent conveyor segment 50 is connected to the downstream end 40b of the first subsequent conveyor segment 40. However, it will be understood that embodiments of the disclosure are not so limited. For example, the system 10 can include at least one other conveyor segment between the first and second subsequent conveyor segments 40 and 50.

The subsequent conveyor segment 50 defines a subsequent conveying surface 54 between the pair of lateral sides 50c and 50d and configured to carry objects along the subsequent-level flow direction $F_1$. For example, the subsequent conveying surface 54 can extend between the first lateral side wall 50c and the first internal wall 50g, such as from the first lateral side wall 50c to the first internal wall 50g. The subsequent conveying surface 54 can also between the upstream end 50a and the downstream end 50b, such as from the upstream end 50a to the downstream end 50b. The subsequent conveying surface 54 has a conveying width $W_{C3}$ along a direction from the first lateral side 50c to the second lateral side 50d, such as along the lateral direction L. For example, the conveying surface width $W_{C3}$ can extend from the first lateral side 50c to the first internal wall 50g. Further, the conveying width $W_{C3}$ can decrease along the subsequent-level flow direction $F_2$.

The subsequent conveyor segment 50 can comprise a plurality of subsequent rollers 56 that define the subsequent conveying surface 54. Each roller 56 can extend along a roller central axis $A_R$ that extends from the first lateral side 50c to the second lateral side 50d. For example, each roller 56 can extend between the first lateral side 50c and the first internal wall 50g along a respective roller central axis $A_R$, such as from the first lateral side 50c to the first internal wall 50g. The subsequent rollers 56 can be powered such that each subsequent roller 56 rotates about a respective central roller axis $A_R$ in a direction that carries objects along the subsequent-level flow direction $F_2$. For example, each subsequent roller 56 can rotate in a direction that is towards the subsequent-level flow direction $F_2$ and downward. It will be understood that, in alternative embodiments, the subsequent conveying surface 54 can be implemented using other suitable conveying mechanisms, such as (without limitation) conveyor belts and wheels.

The subsequent conveyor segment 50 defines a subsequent discharge opening 52 that is between the subsequent conveying surface 54 and the second lateral side 50d. The subsequent discharge opening 52 can extend from the first internal wall 50g to the second lateral side 30d. The subsequent discharge opening 52 extends through the subsequent conveyor segment 50 along the vertical direction V, such as through the top end 50e and the bottom end 50f. Further, the subsequent discharge opening 52 can extend between the upstream end 50a and the downstream end 50b, such as from the upstream end 50a to the downstream end 50b. The subsequent discharge opening 52 has a discharge opening width $W_{D3}$ in a direction from the first lateral side 50c to the second lateral side 50d, such as along the lateral direction L. The discharge opening width $W_{D3}$ can extend from the first internal wall 50g and second lateral side 50d. The discharge opening width $W_{D3}$ can increase along the subsequent-level flow direction $F_2$.

In operation, the subsequent conveyor segment 50 receives objects at various locations between the first and second lateral sides 50c and 50d. All of the objects are aligned with the subsequent discharge opening 52 along the subsequent-level flow direction $F_2$. As a result, each object is carried by the upper conveying surface 54 along the subsequent-level flow direction $F_1$ until a sufficient portion of the object is disposed over the subsequent discharge opening 52 for gravity to pull the object through the subsequent discharge opening 52.

Turning now to the example lower conveyor level 16, the lower conveyor level 16 conveys objects along the lower-level flow direction $F_3$. The lower-level flow direction $F_3$ can be opposite the subsequent-level flow direction $F_2$, although embodiments of the disclosure are not so limited. Additionally or alternatively, the lower-level flow direction $F_3$ can be the same as the upper-level flow direction $F_1$, although embodiments of the disclosure are not so limited. Moreover, the lower conveyor level 16 can be controlled by the controller to convey objects at a respective speed. The controller can set the speed of the lower conveyor level to be different from that of at least one of the upper conveyor level 12 and the subsequent conveyor level 14. In a preferred embodiment, the speed of the lower conveyor level 16 is greater than the speed of the subsequent conveyor level 14. This can help to limit objects on the subsequent conveyor level 14 from falling onto objects on the lower conveyor level 16. Further, when an object does fall from the subsequent conveyor level 14 onto an object residing on the lower conveyor level 16, the faster speed of the lower conveyor level 16 can cause the falling object to slip off of the object residing on the lower conveyor level 16 to a position that is behind the object residing on the lower conveyor level 16 with respect to the lower-level flow direction $F_3$.

The lower conveyor level 16 has at least one lower conveyor segment 60 disposed at least partially below the second subsequent conveyor segment 50 so as to receive objects falling from the second subsequent conveyor segment 50. The lower conveyor segment 60 has an upstream end 60a, and a downstream end 60b opposite the upstream end 60a along the lower-level flow direction $F_3$. The lower conveyor segment 60 has a pair of first and second lateral sides 60c and 60d that oppose one another. The first and second lateral sides 60c and 60d can be parallel to one another, although embodiments of the disclosure are not so limited. Further, the lower conveyor segment 60 has a top side 60e, and a bottom side 60f that opposes the top side 60e along a vertical direction V. The lower conveyor segment 60 defines a lower-level conveying surface 64 between the first and second lateral sides 60c and 60d and between the upstream and downstream ends 60a and 60b. For example, the lower-level conveying surface 64 can extend from the first lateral side 60c to the second lateral side 60d, and from the upstream end 60a to the downstream end 60b. The lower-level conveying surface 64 can be devoid of any discharge openings that discharge objects to a succeeding conveyor level. The lower conveyor segment 60 can include (without limitation) a plurality of rollers, a conveyor belt, or other suitable conveying elements that define the lower conveying surface 64.

Turning now to FIGS. 5 to 7, the conveyor system can include at least one knock-down device 70 configured to reorient objects from a stacked orientation to a sequential orientation. The knock-down device 70 has a knock-down body 72 that is supported such that the knock-down body 72 is spaced entirely from a conveying surface (e.g., 24, 34, 38, or 54 in FIG. 1) of one of the conveyor segments along the vertical direction V by at least a clearance height $H_C$. The knock-down body 72 has an upstream body end 72a, and a downstream body end 72b offset from the upstream body end 72a with respect to a respective flow direction (e.g., $F_1$ or $F_2$). The knock-down body 72 has a first lateral body side 72c, and a second lateral body side 72d spaced from the first lateral body side 72c along the lateral direction L.

The knock-down body 72 further has a ramped surface 74 that extends between the upstream body end 72a and the downstream body end 72b, such as from the upstream body end 72a to the downstream body end 72b. The ramped surface 74 can extend between the first lateral body side 72c and the second lateral body side 72d, such as from the first lateral body side 72c to the second lateral body side 72d. The ramped surface can have an upstream edge 76 at the upstream body end 72a. The upstream edge 76 can between the first lateral body side 72c and the second lateral side 72d, such as from the first lateral body side 72c to the second lateral side 72d, so as to define the clearance height $H_C$. Further, the ramped surface 74 can have a width $W_R$ from the first lateral body side 72c to the second lateral body side 72d that is greater than or equal to a width of the conveyor segment (e.g., 20, 30, or 50)

The ramped surface 74 is ramped away from the conveying surface (e.g., 24, 34, 38, or 54) as the ramped surface extends along the flow direction (e.g., $F_1$ or $F_2$). In some embodiments, the ramped surface 74 can be curved from the upstream body end 72a to the downstream body end 72b. For example, the ramped surface 74 can be convex as it extends from the upstream body end 72a to the downstream body end 72b. In alternative embodiments, as shown in FIGS. 1 and 2, the ramped surface can be planar between the upstream body end 72a and the downstream body end 72b, and between the pair of lateral body sides 72c and 72d.

The knock-down body 72 can be supported over the conveying surface by at least one support member 78, such as plurality of support members 78. Each of the at least one support member 78 can be a leg that extends down from the knock-down body 72 along the vertical direction V. The at least one support member can include at least one pair of legs 78, such as first and second pairs of legs 78. The legs 78 of each pair can be spaced from one another along the lateral direction L by a support-member width Ws. The support-member width Ws can be greater than the width of the conveying segment (e.g., 20, 30, or 50) such that the knock-down device 70 straddles the conveying segment (e.g., 20, 30, or 50). It will be understood that, in alternative embodiments, each of the at least one support member 78 can configured in any suitable manner, such as (without limitation) at least one hanger that hangs the knock-down body 72 from an overhead structure.

In operation, the knock-down device 70 can separate and reorient objects from a stacked configuration to a sequential orientation. For example, suppose that the conveying surface (e.g., 24, 34, 38, or 54) carries a first object having a first height less than the clearance height $H_C$ along the vertical direction V, and carries a second object stacked on top of the first object such that the first and second objects have a combined stacked height along the vertical direction V that is greater than the clearance height $H_C$. In this situation, the first object passes under the knock-down body 72 along the flow direction (e.g., $F_1$ or $F_2$). Further, the ramped surface 74 impedes a path of the second object along the flow direction so as to allow the first object to separate from the second object as the first object passes under the knock-down body 72. The second object can translate up the ramped surface 74 until the first object passes under the knock-down body 72, and then the second object can translate (i.e., fall back down) onto the conveying surface (e.g., 24, 34, 38 or 54) behind the first object. The second object can then be passed on the conveying surface in the flow direction under the knock-down body 72. The ramped surface 74 preferably has a length $L_R$ that is sufficient to prevent the second object from translating over the ramped surface 74 and falling over the downstream body end 72b onto the conveying surface.

The knock-down device 70 can additionally or alternatively tip over objects having a height that is greater than the clearance height. For example, suppose that the conveying surface (e.g., 24, 34, 38 or 54) carries an object having a height along the vertical direction that is greater than the clearance height $H_C$, and a width along the flow direction that is smaller than the clearance height $H_C$. When the object impacts the knock-down body 72, the knock-down body can cause the top of the object to tip backwards onto the conveying surface (e.g., 23, 34, 38, or 54) such that the height of the object is oriented along the flow direction and the width of the object is oriented along the vertical direction V.

Turning now to FIGS. 8 to 12, the conveyor system 10 can include at least one undulation conveyor 80 configured to undulate objects that are received on the conveyor 80 in a stacked orientation so as to dislodge the objects from the stacked orientation. The undulation conveyor 80 can implement the first subsequent conveyor segment 40 as shown in FIGS. 1 and 2. Additionally or alternatively, the undulation conveyor 80 can be implemented at any other suitable location in the conveyor system 10, including at any suitable location along the upper conveyor level 12, the subsequent conveyor level 14, and the lower conveyor level 16.

The undulation conveyor segment 80 has an upstream end 80a, and a downstream end 80b opposite the upstream end 80a along a flow direction F. The undulation conveyor segment 80 has a pair of first and second lateral sides 80c and 80d that oppose one another along the lateral direction L. The first and second lateral sides 80c and 80d can be parallel to one another, although embodiments of the disclosure are not so limited. Further, the undulation conveyor segment 80 has a top side 80e, and a bottom side 80f that opposes the top side 80e along the vertical direction V. The undulation conveyor segment 80 defines an undulating conveying surface 84 between the first and second lateral sides 80c and 80d and between the upstream and downstream ends 80a and 80b. For example, the undulating conveying surface 84 can extend from the first lateral side 80c to the second lateral side 80d, and from the upstream end 80a to the downstream end 80b. The undulating conveying surface 84 can be devoid of any discharge openings that discharge objects to a conveyor level below the undulation conveyor segment 80. The undulation conveyor segment 80 can include a conveyor belt 86 or other conveying mechanism such as mesh that defines the undulating conveying surface 84.

Referring more specifically to FIGS. 9-12, the undulation conveyor segment 80 includes a plurality of undulation rollers 90 configured to undulate the undulating conveying surface 84 as the rollers 90 rotate. Each roller 90 includes a shaft 92 having a first lateral shaft end 92a, a second lateral shaft end 92b spaced from the first lateral shaft end 92a along a shaft longitudinal axis $A_S$, and a shaft outer surface 92c that extends from the first lateral shaft end 92a to the second lateral shaft end 92b. The shaft longitudinal axis $A_S$ extends in a direction that extends from the first lateral side 80c to the second lateral side 20d, such as along the lateral direction L. The shaft outer surface 92c can have a circular cross-section in a plane that is perpendicular to the shaft longitudinal axis $A_S$, although embodiments of the disclosure are not limited to a circular cross-section. The shaft outer surface 92*c* has an outer dimension $D_S$, such as a diameter, in a plane that is perpendicular to the shaft longitudinal axis $A_S$.

Each roller 90 has a plurality of eccentric fins or cam members 94 that are spaced from one another along the shaft longitudinal axis $A_S$. Each fin 94 includes lobes protruding from the shaft such that each roller 90 has a non-circular cross-sectional shape at each cam member 94 in a plane that is perpendicular to the shaft longitudinal axis $A_S$. For example, each cam member 94 can include at least one protrusion 96 that extends outwardly from the shaft outer surface 92*c* and that at least partially defines the eccentric non-circular cross-sectional shape. The cross-sectional shape of each cam member 94 can be symmetrical or irregular along the shaft longitudinal axis $A_S$. Each roller 90 has an outer cross-sectional diameter or dimension $D_C$ at each cam member 94 in a plane that is perpendicular to the shaft longitudinal axis $A_S$, where the cam member outer dimension $D_C$ is greater than the outer shaft dimension $D_S$. When each roller 90 rotates about its respective shaft longitudinal axis $A_S$, the cam members 94 intermittently contact the conveying surface 84 so as to cause the conveying surface 84 to undulate. For example, the cam members 94 can result in the formation of one or both of (i) longitudinal waves in the conveying surface 84 in which the waves propagate forwards and backwards along the flow direction F and (ii) transverse waves in the conveying surface 84 in which the waves propagate up and down along vertical direction V.

In the example of FIGS. 9-12, each cam member 94 has four lobes or protrusions 96 that extend outwardly from the shaft outer surface 92*c*. The four protrusions 96 are spaced equally around the shaft outer surface 92*c* so as to define a valley 98 between each pair of adjacent protrusions 96. Preferably, the protrusions 96 merge smoothly into the valleys 98. It will be understood that, in alternative embodiments, each roller 90 can have as few as one protrusion 96 or greater than four protrusions 96. Moreover, it will be understood that the shapes and configurations of each cam member 94 can vary from the shapes and configurations shown.

Each pair of adjacent rollers 90 can include cam members 94 that are offset from one another with respect to the lateral direction L. For example, as shown in FIGS. 9 and 11, a first roller 90*a* can include a first plurality of cam members 94*a*, and an adjacent second roller 90*b* can include a second plurality of cam members 94*b*. At least one of the cam members 94*a* of the first roller 90*a* can be between a pair of adjacent cam members 94*b* of the second roller 90*b* with respect to the lateral direction L. Similarly, at least one of the cam members 94*b* of the second roller 90*b* can be between a pair of adjacent cam members 94*a* of the first roller 90*a* with respect to the lateral direction L. For example, a plurality of the cam members 94 of the first roller 90*a* can each be between a different pair of adjacent cam members 94*b* of the second roller with respect to the lateral direction L. Similarly, a plurality of the cam members 94 of the second roller 90*b* can each be between a different pair of adjacent cam members 94*a* of the first roller with respect to the lateral direction L.

As described above, the undulating conveying surface 84 is configured to carry objects along a flow direction F. The rollers 90 can be controlled by the controller to rotate about their respective shaft longitudinal axes $A_S$ in any suitable direction under the undulating conveying surface 84. For example, each roller 90 can rotate in a direction that is towards the flow direction F and downward along the vertical direction V. In some at some such embodiments, the rollers 90 can drive the undulating conveying surface 84. In other words, rotation of the rollers 90 can cause the undulating conveying surface 84 to translate along the flow direction F.

In other embodiments, the rollers 90 can rotate independently of the translation of the undulating conveying surface 84. In other words, the undulating conveying surface can be driven along the flow direction F by a mechanism other than the undulating rollers 90. For example, each roller 90 can rotate in a direction that is opposite the flow direction F and downward along the vertical direction V. As another example, adjacent rollers 90 can rotate in opposite directions about their respective shaft longitudinal axes $A_S$. For instance, a first roller 90*a* can rotate in a direction that is towards the second roller 90*b* and downward along the vertical direction V, and the second roller 90*b* can rotate in a direction that is towards the first roller 90*a* and downward along the vertical direction V. Alternatively, the first roller 90*a* can rotate in a direction that is away from the second roller 90*b* and downward along the vertical direction V, and the second roller 90*b* can rotate in a direction that is away from the first roller 90*a* and downward along the vertical direction V. The rollers 90 can also rotate at a speed that is same as or different from the speed that the conveying surface 84 travels.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed is:

1. A conveyor system configured to reorient objects from a stacked orientation to a sequential orientation, the conveyor system comprising:
   a conveyor segment having an upstream end, a downstream end opposite the upstream end along a flow direction of the conveyor segment, a pair of lateral sides that oppose one another along a lateral direction that is perpendicular to the flow direction, a top side, and a bottom side that opposes the top side along a vertical direction that is perpendicular to both the flow direction and the lateral direction, the conveyor segment defining a conveying surface configured to carry objects along the flow direction; and a knock-down device having a knock-down body and at least one support member that supports the knock-down body such that the knock-down body is spaced entirely from the conveying surface along the vertical direction by at least a clearance height, the knock-down body having an upstream body end, a downstream body end offset from the upstream body end with respect to the flow direction, and a ramped surface that extends from the upstream body end to the downstream body end, the ramped surface being ramped away from the conveying surface as the ramped surface extends along the flow direction, wherein, when the conveying surface carries a first object having a first height less than the clearance height along the vertical direction, and carries a second object stacked on top of the first object, the first and second objects having a combined stacked height along the vertical direction that is greater than the clearance height, the first object passes under the knock-down body, and the ramped surface impedes a path of the second object along the flow direction so as to separate the second object from the first object.

2. The conveyor system of claim 1, wherein the ramped surface is planar as it extends from the upstream body end to the downstream body end.

3. The conveyor system of claim 1, wherein the ramped surface is curved from the upstream body end to the downstream body end.

4. The conveyor system of claim 3, wherein the ramped surface is convex as it extends from the upstream body end to the downstream body end.

5. A conveyor system, comprising:
a conveyor segment having an upstream end, and a downstream end opposite the upstream end, the conveyor segment defining a conveying surface configured to carry objects along a flow direction that extends from the upstream end to the downstream end; and a knock-down device having knock-down body that is spaced entirely from the conveying surface along a vertical direction by at least a clearance height, the knock-down body having an upstream body end, a downstream body end offset from the upstream body end with respect to the flow direction, and a ramped surface that extends between the upstream body end and the downstream body end, the ramped surface being ramped away from the conveying surface as the ramped surface extends along the flow direction.

6. The conveyor system of claim 5, wherein the ramped surface is planar between the upstream body end and the downstream body end.

7. The conveyor system of claim 5, wherein the ramped surface is curved between the upstream body end and the downstream body end.

8. The conveyor system of claim 7, wherein the ramped surface is convex as it extends between the upstream end and the downstream end.

9. The conveyor system of claim 8, wherein the ramped surface has an upstream edge at the upstream end, the upstream edge extending from the first lateral side to the second lateral side so as to define the clearance height.

10. The conveyor system of claim 7, wherein the knock-down body has a first lateral side and a second lateral side spaced from one another along a lateral direction, and the ramped surface extends from the first lateral side to the second lateral side.

11. The conveyor system of claim 10, wherein the conveyor segment has a first lateral side and a second lateral side spaced from one another along the lateral direction, and the conveying surface and knock-down body each have a width along the lateral direction, the width of the knock-down body being greater than or equal to the width of the conveying surface.

12. The conveyor system of claim 5, comprising at least one support member configured to support the knock-down body over the conveying surface.

13. The conveyor system of claim 12, wherein each of the at least one support members is a leg that extends down from the knock-down body along the vertical direction.

14. The conveyor system of claim 13, wherein the conveyor segment has a first lateral side and a second lateral side spaced from one another along a lateral direction, the conveying surface has a width along the lateral direction, and the at least one support member includes a pair of legs spaced from one another along the lateral direction by a distance, the distance between the pair of legs being greater than the width of the conveying surface.

15. The conveyor system of claim 5, wherein at least one conveyor level of the conveyor system includes a vibrating conveyor segment having a vibrating conveying surface and a plurality of rollers under the vibrating conveying surface, each of the plurality of rollers having a plurality of cam members spaced along a lateral direction, perpendicular to the flow direction and the vertical direction, each cam member configured to contact the vibrating conveying surface so as to cause the vibrating conveying surface to undulate.

16. A method of reorienting objects from a stacked orientation to a sequential orientation, the method comprising:
(a) carrying a first object on a conveying surface of a conveyor segment along a flow direction, the first object having a first height along a vertical direction;
(b) carrying a second object stacked on top of the first object, the first and seconds objects having a combined height along the vertical direction;
(c) passing the first object on the conveying surface under a knock-down body of a knock-down device along the flow direction, the knock-down body being spaced entirely over the conveying surface along the vertical direction by at least a clearance height that is greater than the first height and less than the combined height; and
(d) impeding a path of the second object along the flow direction with a ramped surface of the knock-down body so as to allow the first object to separate from the second object as the first object passes under the knock-down body, the ramped surface extending away from the conveying surface as the ramped surface extends along the flow direction.

17. The method of claim 16, wherein step (d) comprises the second object translating up the ramped surface until the first object passes under the knock-down body, and the second object translating back down the ramped surface and onto the conveying surface behind the first object.

18. The method of claim 17, comprising (e) passing the second object on the conveying surface in the flow direction under the knock-down body.

19. The method of claim 16, wherein the ramped surface is curved as it extends along the flow direction.

* * * * *